Patented July 31, 1934

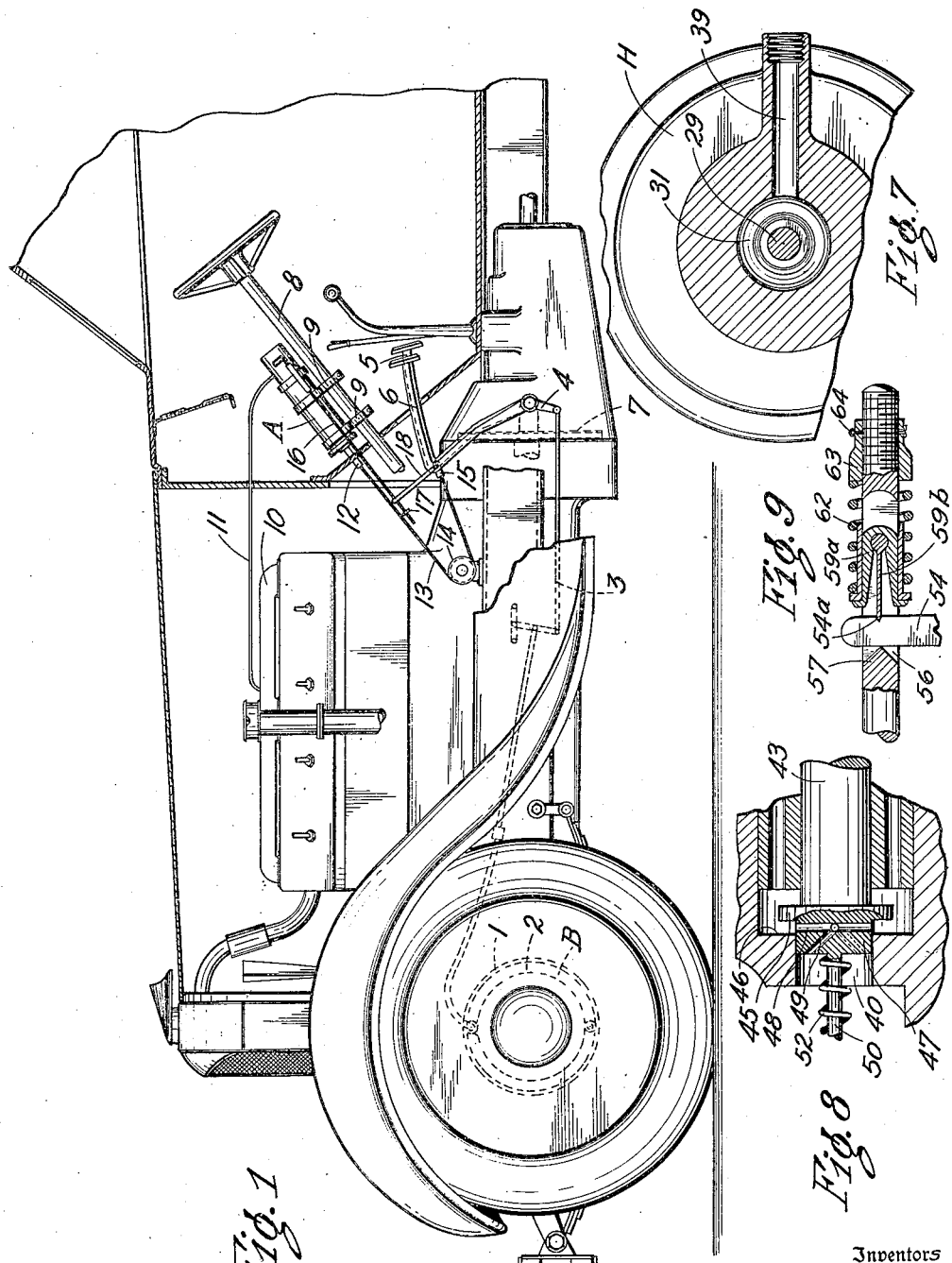
July 31, 1934.  F. G. FOLBERTH ET AL  1,968,485
CONTROL MECHANISM FOR FLUID PRESSURE ACTUATED DEVICES
Filed Oct. 7, 1932  2 Sheets-Sheet 1
Inventors
FREDERICK G. FOLBERTH
& WILLIAM M. FOLBERTH
By Richey & Watts
Attorneys

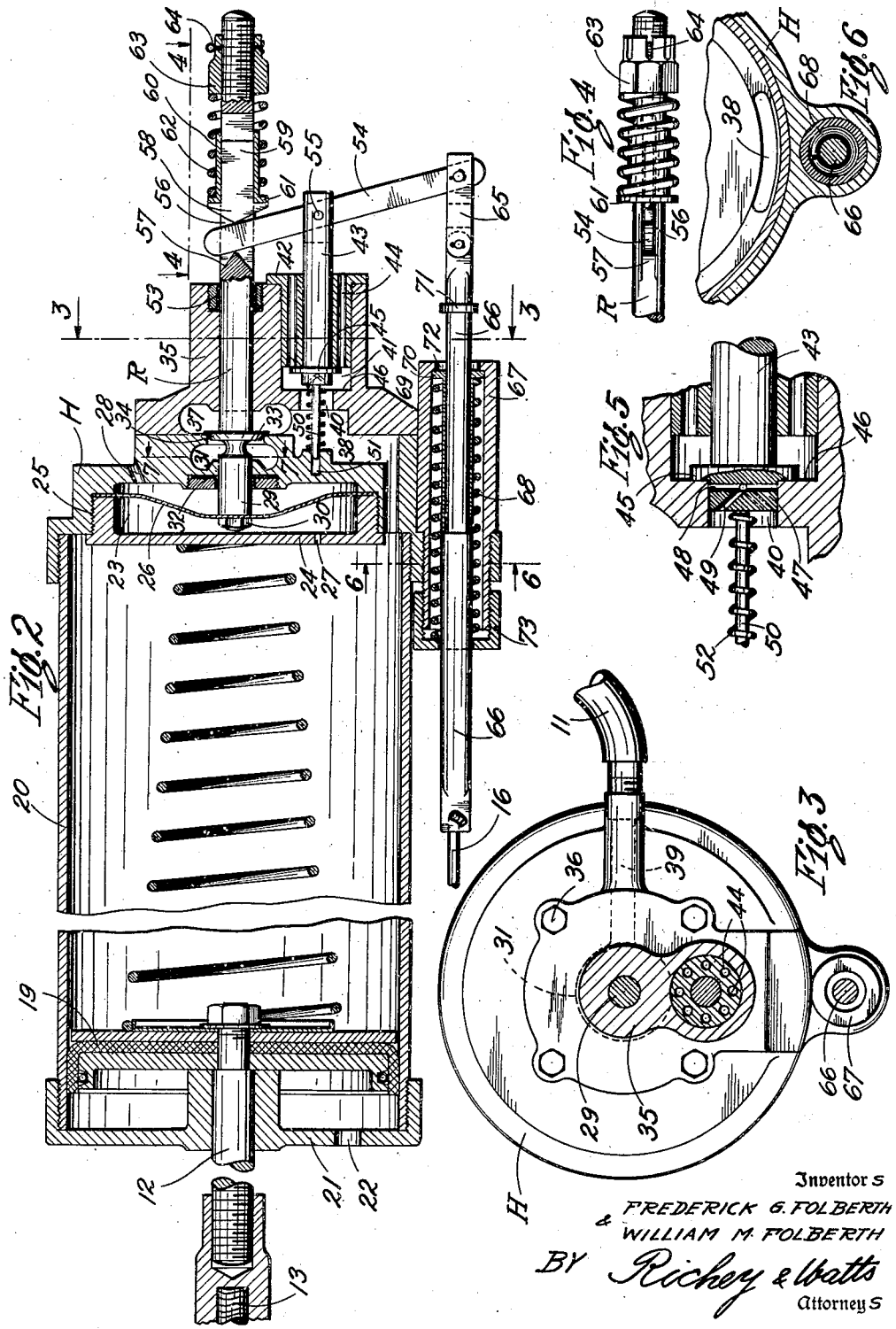

1,968,485

UNITED STATES PATENT OFFICE 1,968,485

CONTROL MECHANISM FOR FLUID PRESSURE ACTUATED DEVICES

Frederick G. Folberth and William M. Folberth, Cleveland, Ohio

Application October 7, 1932, Serial No. 636,704

8 Claims. (Cl. 121—38)

This invention relates to control mechanism for fluid pressure actuated devices and more particularly to an improved type of control valve and means for operating same which may be advantageously used to control the operation of fluid pressure actuated vehicle brakes and the like.

In our co-pending United States patent applications, Serial No. 395,548, filed September 29, 1929 and Serial No. 483,328, filed September 20, 1930 we have described and claimed improved fluid pressure actuated vehicle brake systems, intended primarily for use on automobiles, in which the operation of the vehicle brakes is controlled by movement of the vehicle clutch operating pedal after the clutch pedal has been moved to cause complete disengagement of the clutch. The present invention is illustrated and described herein as applied to this type of brake system.

To secure effective control of an automobile it is essential that means be provided for smoothly and evenly applying the vehicle brakes to the desired degree and it is among the objects of the present invention to provide means for accomplishing this smooth and even application of the vehicle brakes with a minimum of effort on the part of the operator.

Other objects of our invention are: the provision of an improved control valve arrangement for controlling the flow of operating fluid to and from the actuating cylinder of a fluid pressure actuated device; the provision of a control valve which will be effective to create operating pressures within a cylinder which pressures correspond to the degree of movement of the operating lever of the apparatus; the provision of a control valve for fluid pressure brake operating devices which is positive in its action, simple in design, particularly adapted for economical construction and adapted to give long and effective service with a minimum of repair and adjustment; the provision of a control valve of the type described which is particularly adapted for use with sub-atmospheric pressure or vacuum brake operating devices and which incorporates a positively operated means for admitting at the proper rate the proper quantity of air under atmospheric pressure to the operating cylinder when it is desired to release the vehicle brakes; the provision of a fluid pressure actuated brake operating device which may readily be installed on motor vehicles of the usual type with a minimum of labor and expense.

The above and other objects of our invention will appear from the following description of a preferred form thereof, reference being had to the accompanying drawings, in which—

Figure 1 is a sectional fragmentary side elevation of the front end of an automobile illustrating our improved fluid pressure actuated brake operating mechanism in position.

Figure 2 is an enlarged longitudinal cross section of the brake operating cylinder and control valve together with the control valve operating linkage.

Figure 3 is a transverse cross sectional view of our control valve and cylinder taken on line 3—3 of Figure 2.

Figure 4 is a fragmentary plan view taken on line 4—4 of Figure 2 and illustrating the adjustable spring which controls the force applied to operate the vehicle brakes for any given movement of the vehicle control linkage.

Figure 5 is an enlarged fragmentary sectional view illustrating our improved valve means for controlling the connection between the cylinder and the atmosphere.

Figure 6 is a fragmentary cross section taken on line 6—6 of Figure 2.

Figure 7 is a cross section taken on line 7—7 of Figure 2.

Figure 8 is a view similar to Figure 5 but showing the atmospheric connection control valve in its initially opened position.

Figure 9 illustrates a modified form of floating knife-edge adapted for use with our apparatus.

In Figure 1 we have illustrated a conventional type of automobile having wheel brakes, one of which is generally indicated at B and includes the brake drum 1, brake shoe 2, and operating linkage 3 which is connected to the downwardly extended portion 4 of the brake operating lever 5. The usual type of clutch operating lever 6 is provided and may be connected in any suitable manner to operate the vehicle clutch which is diagrammatically indicated at 7 and which is adapted to complete the driving connection between the engine and wheels of the vehicle.

In the installation arrangement illustrated our improved brake actuating device, which is generally indicated at A, and which includes a cylinder, piston, and control valve, as will be later explained, is mounted on the steering column 8 by suitable clamps 9. The operating cylinder of our apparatus is connected through the control valve to a source of sub-atmospheric pressure, such as the engine intake manifold 10, by a conduit 11. The piston of the brake actuating apparatus is provided with a piston rod 12 to which is secured a cable or the like 13. A pulley 14 is mounted on the frame of the vehicle and is adapted to guide the cable 13, one end of which is secured to the brake operating lever 5 as is shown at 15. The control valve for the fluid pressure actuated brake operating device is operated by a downwardly extending rod or cable 16. The details of the valve operating apparatus will be fully described later.

As will be seen from Figure 1 the rod 16 is provided at its lower end with an adjustable stop 17 and the clutch lever 6 carries an extension arm 18 which has a hole in its upper end through which the rod 16 extends.

In the positions in which the parts are shown in Figure 1 the vehicle clutch may be considered to be engaged and the vehicle brake released. From the above description it will be seen that when the operator pushes downwardly on the clutch lever or pedal 6 the first movement thereof will cause disengagement of the vehicle clutch and will cause the arm 18 to slide over the rod 16 without exerting a valve operating force. However, when the arm 18 strikes the stop 17 further downward movement of the vehicle clutch pedal 6 will move the rod 16 and cause corresponding movement of the valve mechanism to connect the intake manifold to the operating cylinder and cause application of the vehicle brakes. By adjusting the position of the stop 17 upon the rod 16, the point in the movement of the clutch lever 6 at which the brake controlling movement starts may be regulated.

Although we have illustrated our brake operating apparatus as installed on the steering column of an automobile it will be understood that other installation arrangements may be used, such as, for example, those which are shown in our co-pending United States patent applications, Serial No. 483,328, filed September 20, 1930, Serial No. 561,569, filed September 8, 1931 and Serial No. 625,502, filed July 28, 1932.

Referring now to Figure 2 which illustrates in detail the brake operating apparatus generally indicated at A in Figure 1, the piston 19, which is mounted on the piston rod 12, is adapted to reciprocate in the cylinder 20. The piston rod end of the cylinder 20 is provided with an end cap 21 having a vent 22 whereby the piston rod end of the cylinder 20 is at all times connected to the atmosphere. The opposite end of the cylinder 20 is provided with an end cap generally indicated at H which serves both as a closure for the end of the cylinder and as a housing for a portion of the control valve mechanism. The diaphragm chamber 23 is formed by the end cap H and the inner cover plate 24 which has threaded engagement with the cap H at 25 and which is adapted to clamp the outer periphery of the diaphragm 26 in position. The diaphragm chamber 23 is divided into two parts by the diaphragm 26 and the portion thereof on the inner or cylinder side of the diaphragm 26 is connected to the cylinder through the relatively small bleeder hole 27. The opposite side of the diaphragm is connected to the atmosphere by the hole 28.

The inner end 29 of the valve carrying rod or valve stem R is secured to the center of the diaphragm 26 by the nut 30 and extends through a suitable bore in the valve housing H into the chamber 31. Packing 32, of any suitable type, may be employed to prevent the passage of the actuating fluid between the diaphragm chamber 23 and the chamber 31 around the rod 29. The poppet valve closure member 33 is formed on, or suitably secured to, the rod R and seats upon the corresponding seating surface 34 on the housing H. The outer valve housing 35 is preferably made separate from the housing H and may be secured thereto by screws 36, as is seen in Figure 3. A chamber 37 is formed in the housing 35 and communicates with the interior of the cylinder 20 through the passage 38. As is seen in Figure 6 the opening of the passage 38 into the cylinder 20 is in the form of an elongated slot and it will be understood that the passage 38 should be made of the proper size to effectively handle the flow of air therethrough.

The chamber 31 is connected to the intake manifold of the vehicle through the tube 11 and the passageway 39 (Figures 3 and 7). The atmospheric connection for the head end of the interior of the cylinder 20 is provided through a passage 40 which extends from the passage 38 through the wall of the housing 35 into an enlarged bore 41 formed in the housing 35. A guide sleeve 42 for the atmospheric connection control valve is secured in place in the bore 41 and is provided with a central aperture which forms a bearing and guide for the rod or stem 43 which carries the atmosphere valve 45 and is provided with a plurality of holes 44, surrounding the central aperture, and providing connection between the passages 38 and 40 and the atmosphere.

As is perhaps best seen in Figure 5 the inner end of the rod 43 carries an enlarged flange or closure member 45 which is adapted to seat on the face 46 of the housing 35. On the opposite side of the valve closure member 45 from the rod 43 is an extension 47 which is adapted to enter the bore 41. As will be seen from Figure 5 the extension 47 does not need to fit tightly in the bore 40 and is provided with small transversely extending holes 48 which extend diametrically across the extension 47 adjacent the flange 45. Connecting passages 49 extend from the holes 48 to the inside face of the extension 47. These holes are provided for purposes which will be later explained.

A guide rod 50 projects from the extension 47 and has a sliding support in a suitable recess 51 in the housing H. The coil spring 52 is supported by the rod 50 and, as it is normally under compression, tends to maintain the rod 43 and the closure member 45 in their wide open position, as shown in Figure 2.

The rod R extends out through and is supported and guided by the housing 35. The packing 53 prevents leakage from the atmosphere into the valve chambers around the rod R.

It will be seen that movement of the rod R will cause the poppet valve 33 to be moved toward or from its seat 34 and this movement is accomplished through the valve operating lever 54 which is pivotally mounted at a point, 55, between its ends on the outer end of the atmospheric control valve rod 43. The upper end of the lever 54 extends through a slot 56 in the rod R. As is clearly seen in Figures 2 and 4 one end of the slot 56 is formed as a knife edge 57 which is engaged by one side of the lever 54. The other side of the lever 54 is engaged by another knife edge 58 which is formed on the flat sliding or floating member 59 which is adapted to slide in the slot 56. A cylindrical sleeve 60, having a flanged end 61, surrounds the rod R and holds the sliding member 59 in position in the slot 56. The flanged end 61 of the sleeve 60 engages the knife-edge portion 58 of the base 59 and also provides a base for the spring 62 which surrounds the sleeve 60. The opposite end of the spring 62 engages an adjustable nut 63 which is threaded on the outer end of the rod R and which may be held in the desired adjusted position by a cotter pin 64 in well known manner.

In Figure 9 we have illustrated a modified form of floating knife-edge for providing the resilient connection between the operating lever 54 and the valve stem R. The apparatus shown in Figure 9 is the same as that illustrated in Figure 2 with the exception that the floating knife-edge is formed in two parts. The U-shaped member 59a fits in the slot 56 and is encompassed by and held in position in the slot by the sleeve 60. The floating or swinging knife-edge member 59b has an enlarged circular end portion 59c which fits in a corresponding recess in the carrying member 59a. The lever 54 is notched at 54a to receive the end of the knife-edge member 59b. With this arrangement the slipping which necessarily takes place between the knife-edges shown in Figure 2 is eliminated as the knife-edge 59b is swingably supported in the member 59a and its knife-edge end remains at all times in the notch 54a in the lever 54. The construction illustrated in Figure 9 reduces friction between the parts to a minimum and provides an effective connection between the operating lever and the valve stem R.

The lower or outer end of the lever 54 is pivotally secured to one end of a connecting link 65, the other end of which is pivoted to a rod 66 which extends into and through the spring housing 67. A coil spring 68 encompasses the rod 66 and is enclosed in the housing 67. The rod 66 carries a sleeve 69 having a flange 70 at its end. This sleeve 69 is disposed within the spring housing 67 and is adapted to slide on the rod 66. A flange or shoulder 71 is formed on the rod 66 and is adapted to pass through the aperture 72 in the end of the spring housing 67.

One end of the spring 68 engages the flange 70 of the sleeve 69 and its other end abuts against the adjustable end cap 73 which has threaded engagement with the end of the spring housing 67. The compression of the spring 68 may be adjusted by regulating the position of the end cap 73. The rod 66 extends on out through the end cap 73 and is connected at its end to the relatively small operating rod 16.

It will be seen that when the rod 66 is moved to the left from the position shown in Figure 2 its initial movement will cause the lever 54 to move about the knife-edge 57 as a pivot until the flange seat 45 of the atmospheric connection control valve engages the face 46 of the housing 35 and closes the atmospheric connection to the interior of the cylinder 20. This initial movement will be resisted only by the normal friction of the parts and the relatively light spring 52 which surrounds the guide rod 50 of the atmosphere valve member. The flange 71 is preferably so positioned on the rod 66 that it will engage the flanged end 70 of the sleeve 69 at substantially the same time as the closure member 45 engages its seat 46. Further movement of the rod 66 to the left will, it will be seen, be against the resistance of the spring 68 and, as the rod 43 cannot move further to the left, the lever 54 will move about the point 55 as a pivot and the rod R will be moved to the right lifting the poppet valve 33 from its seat and completing the connection between the intake manifold and the interior of the cylinder through the conduit 11, passage 39, chamber 31, chamber 37 and passage 38.

As the pressure within the cylinder is reduced the pressure on the inside of the diaphragm is also reduced due to the passage 27 connecting the cylinder and the diaphragm chamber 23. As this passage 27 is relatively small the pressure within the diaphragm chamber 23 and the cylinder will not immediately be equalized. However, as soon as the pressure within the left hand side of the diaphragm chamber 23 becomes reduced to a point where the atmospheric pressure acting on the opposite side of the diaphragm through the passage 28 will exert a force on the rod R sufficient to compress the spring 62, the rod R will be moved to the left and the poppet valve 33 will be closed. When this occurs a balanced condition will be maintained and the brakes will be held applied with a definite, unvarying force.

If, now, an additional force be exerted on the rod 66 to move it farther to the left the lever 54 will act through the spring 62 to again move the rod R and lift the valve 33. This opening of the valve 33 will permit an additional reduction of pressure within the cylinder 20 and, when the pressure differential on the opposite sides of the diaphragm 26 becomes great enough to overcome the spring 62, the valve 33 will again be closed as an equilibrium condition be maintained.

Thus, it will be seen that a gradual and smooth variation of the operating pressure within the cylinder 20 may be secured and that the degree of braking force applied may be accurately and positively controlled.

It has been seen that the initial movement of the rod 66 is against relatively little resistance and closes the atmospheric connection control valve thus placing the apparatus in position to function to apply the vehicle brakes. To control the operation of our brake actuating mechanism to close the connection between the intake manifold and the cylinder and to permit air under atmospheric pressure to enter the cylinder we have provided the atmospheric connection control valve which is mounted on the rod 43. When the force exerted by the operator of the vehicle tending to pull the rod 66 to the left (Figure 2) is released the valve 33, provided it is open, immediately closes because of the pressure differential on the opposite sides of the diaphragm 26 and the flanged valve 45 and the extension 47 of the atmospheric control valve are moved to the right by the spring 52. The initial movement of the atmospheric control valve lifts the closure member 45 away from its seat and a relatively restricted opening to the atmosphere is provided to the interior of the cylinder through the holes 44, the restricted holes 48 and 49 in the extension 47, the passage 40 and the passage 38. The above described position of the atmospheric control valve is illustrated in Figure 8. By providing this restricted opening the atmospheric pressure bleeds into the cylinder slowly and the brakes will be released at a relatively slow rate.

If, however, the rod 43 is permitted to be moved to the left by the spring 52 until the flange 45 engages the inner end of the sleeve member 42, it will be seen that a free passage will be provided between the cylinder and the atmosphere and a practically instantaneous return of the interior of the cylinder to atmospheric pressure will occur. This will cause the usual brake releasing mechanism to instantly release the vehicle brakes.

The above described arrangement of our atmosphereic control valve in which the initial opening of the valve provides a restricted atmospheric connection and the final opening of the valve and unrestricted opening greatly assists in the proper manipulation of the vehicle brakes as it permits the operator to instantaneously and completely release the brakes whenever he desires or to smoothly and gradually release the brakes to any desired extent.

It will be understood that, if desired, our apparatus may be connected up so that the operating force is applied by pushing on the end of the lever 54 opposite to the end to which the rod 66 is attached. In this arrangement the lever 54 would be extended through the slot 56 a distance sufficient to provide the desired leverage and the spring loading device, including the housing 67 and spring 68, would be reversed from its illustrated position.

Although we have described in detail one embodiment of our invention it will be seen by those skilled in the art that modifications and changes may be made without departing from the spirit of the invention and we do not, therefore, limit ourselves to the specific apparatus shown and described, but claim as our invention all embodiments thereof coming within the scope of the appended claims.

We claim:

1. In valve mechanism of the type described, a valve housing, a pair of poppet valves adapted to control the flow of fluid through fluid conducting passages in the valve housing, valve stems secured to each of said valves and extending out of said housing, an operating lever pivotally secured to one of said stems and pivotally and resiliently secured to the other of said stems, said pivotal and resilient connection including a slot formed in the valve stem and having a knife-edge end, a sliding knife-edge member in said slot, a tubular sleeve slidable on said valve stem and adapted to maintain said knife-edge member in position in the slot, said operating lever extending through said slot between said knife-edges, and adjustable spring means encompassing said sleeve and tending to resiliently maintain said sliding knife-edge member in position to hold said operating lever against the knife-edge end of said slot.

2. In valve mechanism of the type described, a valve housing, a pair of poppet valves adapted to control the flow of fluid through fluid conducting passages in the valve housing, valve stems secured to each of said valves and extending out of said housing, an operating lever pivotally secured to one of said stems and pivotally and resiliently secured to the other of said stems, said pivotal and resilient connection including a slot formed in the valve stem and having a knife-edge end, a sliding knife-edge member in said slot, a tubular sleeve slidable on said valve stem and adapted to maintain said knife-edge member in position in the slot, said operating lever extending through said slot between said knife-edges, and spring means encompassing said sleeve and tending to resiliently maintain said sliding knife-edge member in position to hold said operating lever against the knife-edge end of said slot.

3. In apparatus of the type described, a cylinder, valve means for controlling the flow of operating fluid to and from said cylinder, said valve means including a valve housing mounted on said cylinder, a pair of closure members in said valve housing, rods secured to said closure members and extending out through said valve housing, an operating lever pivotally secured to one of said rods and resiliently secured to the other of said rods, spring means for imposing resistance against movement of said operating lever in valve opening direction, said spring means including a housing adjustably mounted on said valve housing and a coil spring within said housing, a valve operating member extending through said spring and spring housing and having a shoulder portion adapted to engage and compress said spring during at least a portion of the movement of said operating member in valve opening direction, and means for connecting said operating member and operating lever whereby movement of said member will be transmitted to said lever.

4. In apparatus of the type described, a cylinder, a control valve mounted at one end of said cylinder, an operating lever for said control valve and means for imposing resistance against the movement of said lever in valve opening direction, said means comprising a flanged rod member secured to said lever, a spring housing secured to said valve housing and having a spring therein, said rod member extending through said spring housing and having its flanged portion spaced from one end of said spring when the control valve operating lever is in its off position and adapted to engage said spring when said lever has been moved a predetermined distance in opening direction.

5. In apparatus of the type described, a cylinder, a control valve mounted at one end of said cylinder, an operating lever for said control valve and means for imposing resistance against the movement of said lever in valve opening direction, said means comprising a flanged rod member secured to said lever, a spring housing adjustably secured to said valve housing and having a spring therein, said rod member extending through said spring housing and having its flanged portion spaced from one end of said spring when the control valve operating lever is in its off position and adapted to engage said spring when said lever has been moved a predetermined distance in opening direction.

6. In a valve mechanism of the type described, a valve housing, a pair of valve closure members adapted to control the flow of fluid through fluid conducting passages in the valve housing, valve stems secured to each of said valve closure members, an operating lever pivotally secured to one of said stems and pivotally and resiliently secured to the other of said stems, said pivotal and resilient connection including a slot formed in the valve stem and having a knife-edge end, a movable knife-edge member in said slot, said operating lever extending into said slot between said knife-edges, and adjustable spring means disposed to maintain said movable knife-edge member in position to hold said operating lever against the knife-edge end of said slot.

7. In a valve mechanism of the type described, a valve housing, a pair of valve closure members adapted to control the flow of fluid through fluid conducting passages in the valve housing, valve stems secured to each of said valve closure members, an operating lever pivotally secured to one of said stems and pivotally and resiliently secured to the other of said stems, said pivotal and resilient connection including a slot formed in the valve stem and having a knife-edge end, a movable knife-edge member in said slot, said operating lever extending into said slot between said knife-edges, and spring means disposed to maintain said movable knife-edge member in position to hold said operating lever against the knife-edge end of said slot.

8. In apparatus of the type described, a cylinder, valve means for controlling the flow of operating fluid to and from said cylinder, said valve means including a valve housing mounted on said cylinder, a pair of closure members in said valve housing, rods secured to said closure members, an operating lever pivotally secured to one of said rods and resiliently secured to the other of said rods, spring means for imposing resistance against movement of said operating lever in valve opening direction, said spring means including a housing mounted on said valve housing and a coil spring within said housing, a valve operating member extending through said spring and spring housing and having a shoulder portion adapted to engage and compress said spring during at least a portion of the movement of said operating member in valve opening direction, and means for connecting said operating member and operating lever whereby movement of said member will be transmitted to said lever.

FREDERICK G. FOLBERTH.
WILLIAM M. FOLBERTH.